(12) United States Patent
Nomura et al.

(10) Patent No.: US 9,375,887 B2
(45) Date of Patent: Jun. 28, 2016

(54) FEEDING DEVICE

(71) Applicants: Fuji Seiko Co., Ltd., Gifu-ken (JP); Fuji Shoji Co., Ltd, Gifu-ken (JP)

(72) Inventors: Shigeaki Nomura, Hashima (JP); Yasunori Ozeki, Hashima (JP)

(73) Assignees: FUJI SEIKO CO., LTD. (JP); FUJI SHOJI CO., LTD. (JP)

( * ) Notice: Subject to any disclaimer, the term of this patent is extended or adjusted under 35 U.S.C. 154(b) by 0 days.

(21) Appl. No.: 14/759,781

(22) PCT Filed: Jan. 21, 2013

(86) PCT No.: PCT/JP2013/051092
§ 371 (c)(1),
(2) Date: Jul. 8, 2015

(87) PCT Pub. No.: WO2014/112126
PCT Pub. Date: Jul. 24, 2014

(65) Prior Publication Data
US 2015/0343728 A1    Dec. 3, 2015

(51) Int. Cl.
*B65G 25/00* (2006.01)
*B29D 30/48* (2006.01)
*B29D 30/00* (2006.01)
*B65G 25/02* (2006.01)

(52) U.S. Cl.
CPC ............ *B29D 30/0016* (2013.01); *B29D 30/48* (2013.01); *B65G 25/02* (2013.01); *B29D 2030/0044* (2013.01); *B29D 2030/487* (2013.01)

(58) Field of Classification Search
CPC ...... B65G 25/00; B65G 25/02; B65G 25/065; B29D 30/32; B29D 30/48; B29D 2030/487

USPC ............... 198/750.14, 750.2–750.8; 156/422, 156/396, 460
See application file for complete search history.

(56) References Cited

U.S. PATENT DOCUMENTS

| 5,336,358 A | 8/1994 | Kawaguchi et al. |
| 5,403,429 A * | 4/1995 | Minakawa .......... B29C 66/1142 156/304.1 |
| 6,379,493 B1 * | 4/2002 | Berning .................... B65H 5/16 156/398 |

FOREIGN PATENT DOCUMENTS

| CN | 2218164 Y | 1/1996 |
| JP | 0550526 A | 3/1993 |
| JP | 668822 | 9/1994 |
| JP | 2000355056 A | 12/2000 |
| JP | 2001130730 A | 5/2001 |
| JP | 2004210451 A | 7/2004 |

OTHER PUBLICATIONS

International Search Report for PCT/JP2013/051092, mailed Apr. 16, 2013, pp. 1-2.

(Continued)

*Primary Examiner* — James R Bidwell
(74) *Attorney, Agent, or Firm* — Tarolli, Sundheim, Covell & Tummino LLP

(57) ABSTRACT

A feeding device includes a suspension bar for suspending an annular body. The feeding device includes a feeding bar, which extends in parallel with the suspension bar. The feeding bar is operable to intermittently move the annular body in the feeding direction inside the annular body suspended from the suspension bar. The feeding device includes a motor for operating the feeding bar.

4 Claims, 4 Drawing Sheets

(56) References Cited

OTHER PUBLICATIONS

International Preliminary Report on Patentability for corresponding PCT/JP2013/051092 dated Jul. 21, 2015.

Chinese Office Action for Application No. 201380070205.0 dated May 4, 2016.
"Mechanisms and Mechanical Devices Sourcebook" Neil Sclater, et al., p. 15, Apr. 30, 2007.

\* cited by examiner

FEEDING DEVICE

RELATED APPLICATIONS

The present invention is a U.S. National Stage under 35 USC 371 patent application, claiming priority to Ser. No. PCT/JP2013/051092, filed on Jan. 2013; the entirety of which is incorporated herein by reference.

BACKGROUND OF THE INVENTION

The present invention relates to a feeding device that is used in manufacture of annular bodies, e.g., bead wires used for vehicle tires, to store manufactured annular bodies, which are suspended in order.

For example, in a conventional manufacturing process of bead wires, which are used for vehicle tires, a bead wire is shaped by winding a wire material, and its surface is covered with a rubber tape. A plurality of annular bead wires, in which shaping and covering are completed, is supplied in order to a suspension bar for inspection. The suspended bead wires are then stored. Work such as an inspection for a winding condition of the wire material and a covering condition of the rubber tape is performed on each of the bead wires, which are suspended from the suspension bar.

However, the conventional manufacturing process of bead wires has a problem. That is, each bead wire supplied to one end of the suspension bar is manually moved toward the other end by a worker so that the suspended bead wires are arranged on the suspension bar at predetermined intervals. The work to arrange the bead wires on the suspension bar is cumbersome and takes time.

Patent Document 1 discloses a storing device for bead wires that is capable of automatically arranging bead wires.

The storing device of Patent Document 1 is adapted to suspend a bead wire on a suspension bar and feed the suspended bead wire by pushing from the side with a contact portion driven by a cylinder.

However, the storing device of Patent Document 1 needs a spacer placed between each pair of adjacent bead wires to prevent the bead wires from sticking together by stickiness of the rubber tapes on their surfaces. This makes the manufacturing process cumbersome.

PRIOR ART DOCUMENT

Patent Document

Patent Document 1: Japanese Laid-open Patent Publication No. 2000-355056

SUMMARY OF THE INVENTION

Accordingly, it is an objective of the present invention to provide a feeding device that allows for easy arrangement of annular bodies, which are spaced from each other and suspended from a suspension bar.

To achieve the foregoing objective, a feeding device is provided that is characterized by including at least one suspension bar for suspending an annular body, at least one feeding bar, and a driving mechanism that operates the feeding bar. The feeding bar extends in parallel with the suspension bar and is operable to intermittently move the annular body in a feeding direction inside the annular body suspended from the suspension bar.

Accordingly, annular bodies are intermittently supplied and suspended from an end of the suspension, bar in the feeding device. A driving member operates the feeding bar to cause feeding movement inside the suspended annular bodies. The feeding bar intermittently moves the suspended annular bodies toward the other end of the suspension bar. Thus, the feeding device, which is applied in a manufacturing process of annular bodies such as bead wires, automatically arranges manufactured annular bodies on the suspension bar to be spaced from each other and stores the suspended annular bodies. This reduces operating time.

The above described feeding device achieves an advantage that annular bodies are easily arranged on a suspension bar while being spaced from each other.

BRIEF DESCRIPTION OF THE DRAWINGS

FIG. 2 is a cross-sectional view taken along line 2-2 of FIG. 1;

DETAILED DESCRIPTION OF THE PREFERRED EMBODIMENTS

A storing device for bead, wires including a feeding device according to one embodiment will now be described with reference to the drawings.

Figure 1:
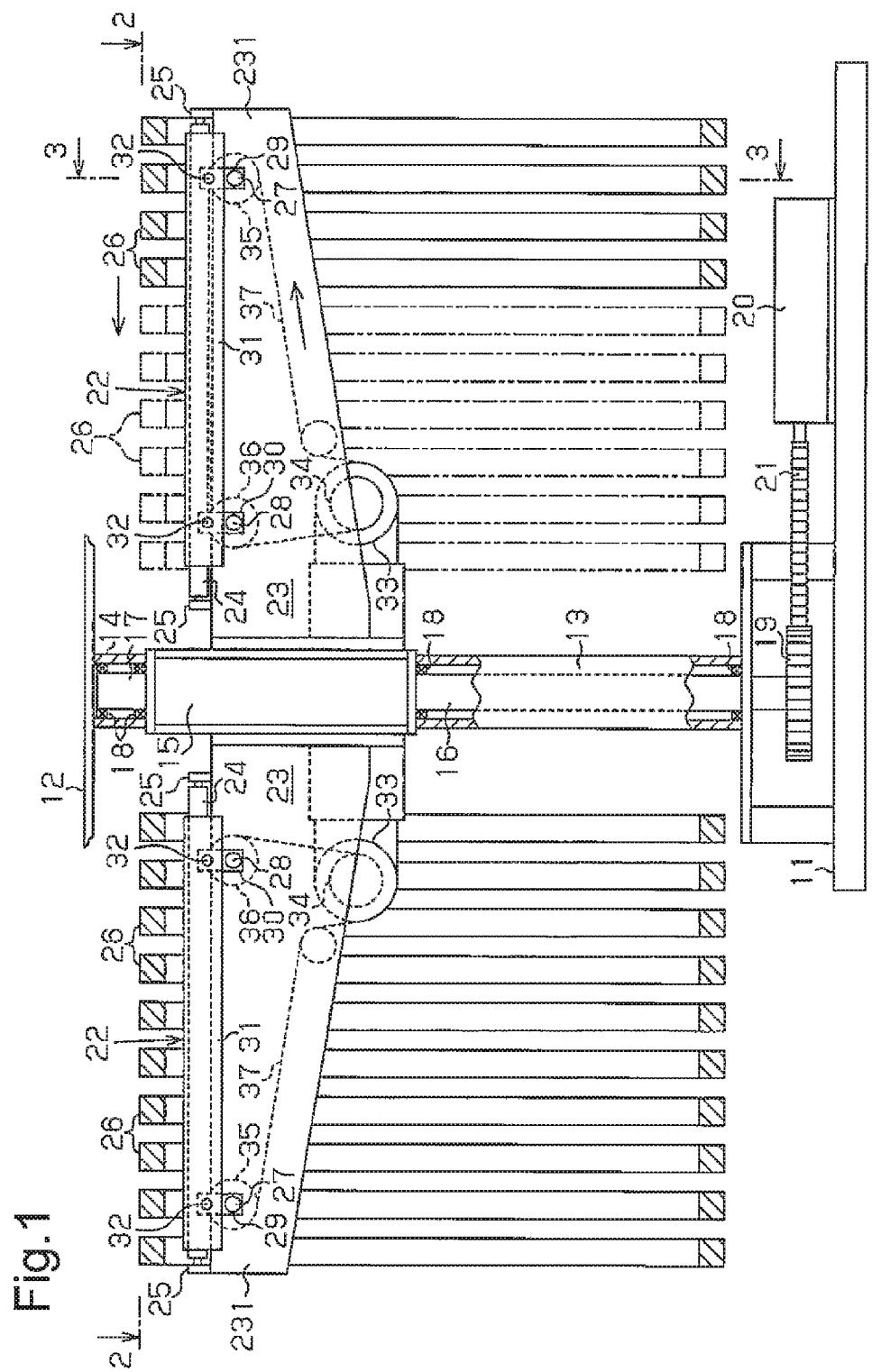
Figure 2:
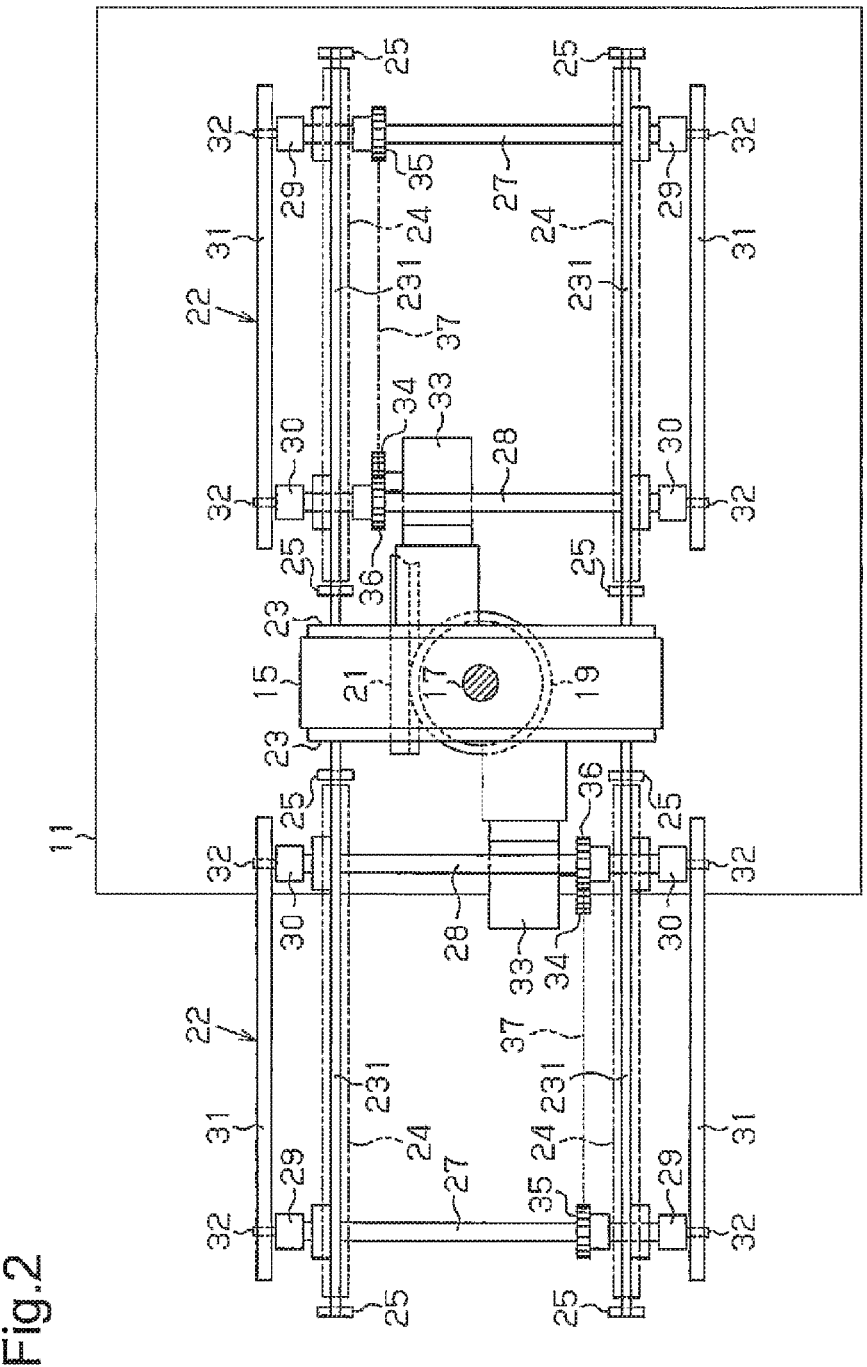
FIG. 2 is a front view, with parts cut away, illustrating a storing device for bead wires including a feeding device according to one embodiment.

As shown in FIGS. 1 and 2, the storing device includes a base 11 and a fixed frame 12 fixed above the base 11. A supporting pipe 13 is arranged on the top of the base 11 and extends upward. A supporting pipe 14 is arranged on the bottom of the fixed frame 12 and extends downward. The supporting pipes 13 and 14 are arranged on a common vertical axis to face each other. A turning frame 15 is arranged between the supporting pipes 13 and 14. The turning frame 15 is provided with a pivot 16, which extends downward from the bottom of the turning frame 15, and a spindle 17, which extends upward from the top of the turning frame 15. The turning frame 15 is supported by the supporting pipes 13 and 14 to turn about the pivot 16 and the spindle 17 via bearings 18. A pinion 19 is attached to the lower end of the pivot 16 and turns with the pivot 16. A cylinder 20 including a piston rod is arranged on the top of the base 11. The piston rod selectively moves forward or backward in the extending direction of the base 11. A rack 21, which meshes with the pinion 19, is coupled to the piston rod of the cylinder 20. The piston rod of the cylinder 20, which is moved to project or be retracted, turns the turning frame 15 back and forth around a vertical axis within the angular range of 180 degrees via the rack 21 and the pinion 19.

Figure 3:
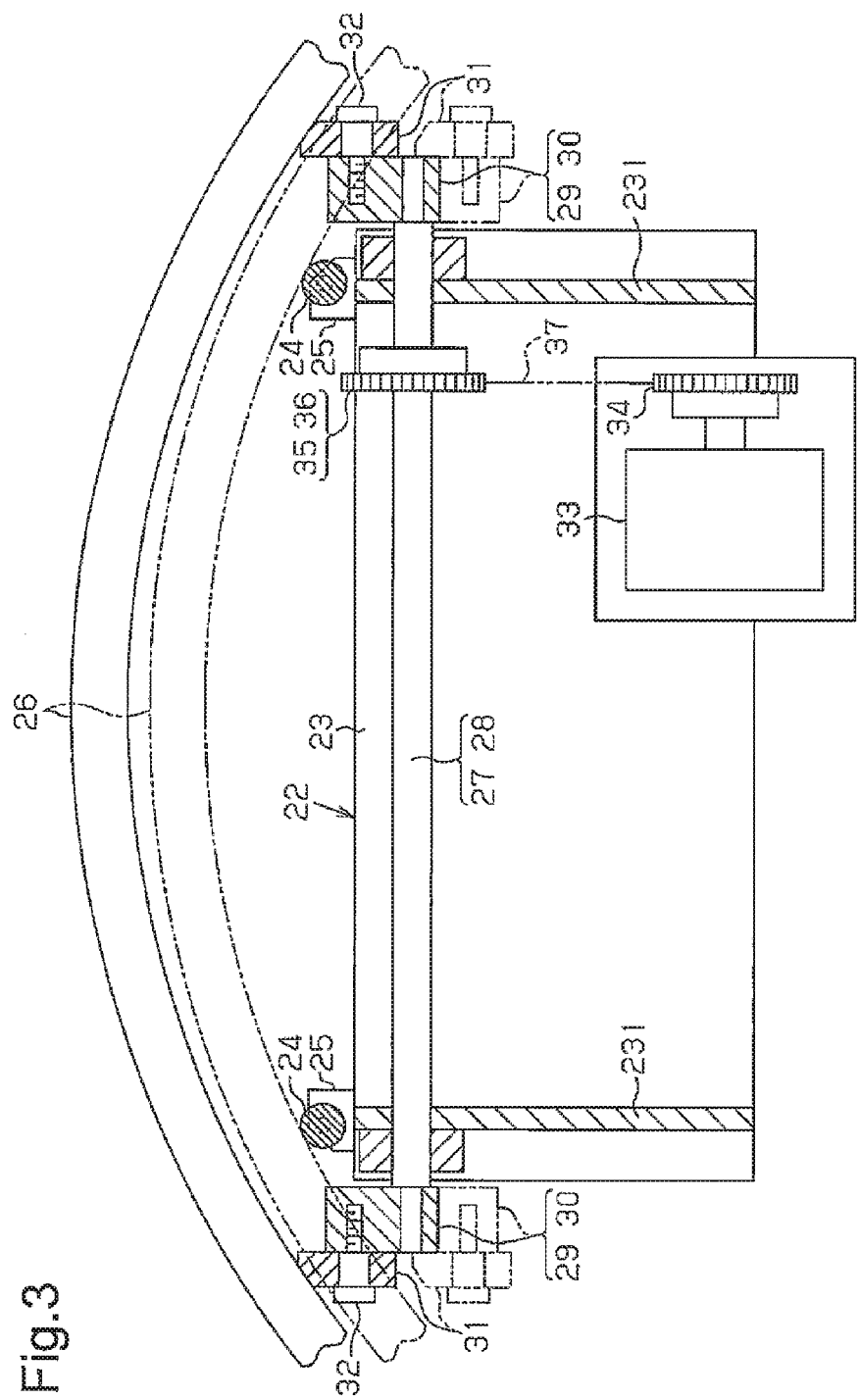
FIG. 3 is an enlarged cross-sectional view taken along line 3-3 of FIG. 1 showing a part of the storing device.

As shown in FIGS. 1 to 3, two feeding devices 22 are symmetrically supported at two lateral faces of the turning frame 15 so that the angular difference between the feeding devices 22 is 180 degrees in the turning direction of the turning frame 15. Each feeding device 22 is provided with a supporting frame 23, which is fixed to a lateral portion of the turning frame 15. The supporting frame 23 is provided with a pair of supporting arms 231, which is spaced from each other and extends in parallel. Two bearing bodies 25 are arranged on each supporting arm 231 of the supporting frame 23 and located near the basal end and the distal end of the supporting arm 231. A cylindrical suspension bar 24 formed with a roller is rotationally supported between the bearing bodies 25 of each supporting arm 231. The two suspension bars 24 of the feeding device 22 are rotational about respective horizontal axes, which are parallel to each other.

With turning of the turning frame 15, each of the feeding devices 22 is movable between a first position, which is indicated on the right side as viewed in FIG. 1, and a second position, which is indicated on the left side as viewed in FIG. 1. A supply device (not shown) is arranged rightward of FIG. 2. The supply device supplies manufactured bead wires 26 to one of the feeding devices 22 that is positioned at the first position. The bead wires 26 are supplied from the distal sides of the supporting arms 231 in the feeding device 22. The supplied bead wires 26 are suspended from the distal ends of the suspension bars 24.

As shown in FIGS. 1 to 3, the supporting arms 231 of each supporting frame 23 has distal ends, which support a rotary shaft 27, and basal ends, which support a rotary shaft 28. The rotary shafts 27 and 28 are rotational about the respective horizontal axes, which are parallel and extend in a direction crossing the rotation axes of the suspension bars 24. Each end of the rotary shaft 27 is fixed to the basal end of a crank 29. Each end of the rotary shaft 28 is fixed to the basal and of a crank 30. As a result, a pair of cranks 29 and 30 is provided for each suspension bar 24. The cranks 23 of the paired suspension bars 24 rotate about the common rotary shaft 27, and the cranks 30 rotate about the common rotary shaft 28. As shown in FIGS. 2 and 3, a pair of feeding bars 31, which is wade of plates, is arranged to sandwich the paired suspension bars 24 and extend in parallel with the suspension bars 24. Each feeding bar 31 is supported by the distal ends of the corresponding cranks 29 and 30 via spindles 32 to be rotational relative to the cranks 29 and 30.

Figure 4:
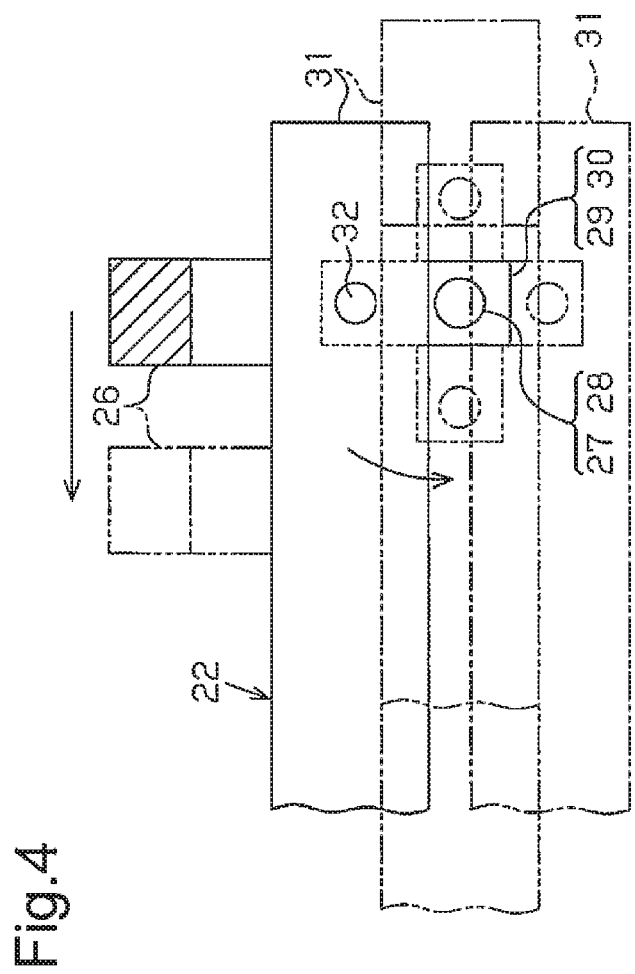
FIG. 4 is an enlarged front view showing a primary part of the feeding device of FIG. 1 to illustrate its operation.

As shown in FIGS. 1 to 3, a motor 33 is arranged on each supporting frame 23 and functions as a driving member. A driving sprocket 34 is attached to the shaft of the motor 33. Driven sprockets 35 and 36, which correspond to the driving sprocket 34, are fixed to the rotary shafts 27 and 28, respectively. A chain 37 is looped over the driving sprocket 34 and the driven sprockets 35 and 36. The motor 33, the cranks 23 and 30, the chain 37, the driving sprocket 34, and the driven sprockets 35 and 36 form a driving mechanism that drives the feeding bars 31. When the motor 33 is rotated in the feeding device 22 positioned at the first position, the rotary shafts 27 and 28 rotate counterclockwise as viewed in FIGS. 1 and 4 via the driving sprocket 34, the chain 37, and the driven, sprockets 35 and 36. The rotation of the rotary shafts 27 and 28 causes feeding movement in the feeding bars 31 via the cranks 29 and 30. The feeding bars 31 move the bead wire 26 from the distal sides to the basal sides of the suspension bars 24. inside the bead wire 26 suspended from the suspension bars 24. FIG. 4 shows one of the feeding bars 31 with the corresponding cranks 29 and 30. As indicated by solid lines and dotted lines in FIG. 4, the cranks 23 and 30 rotate counterclockwise, and the feeding bar 31 moves with the corresponding spindles 32, which are arranged at the distal ends of the cranks 29 and 30. While the cranks 29 and 30 rotate once, the spindles 32 each pass through four positions. Thus, the feeding movement of the feeding bar 31 is referred to as four-phase feeding movement. The height of the feeding bar 31 is set to become taller than the height of the corresponding suspension bar 24 while the cranks 29 and 30 rotate. During the rotation of the cranks 29 and 30, the feeding bar 31 moves up to lift the bead wire 26 from the suspension bar 24 and moves from the distal side to the basal side of the suspension bar 24, i.e., in the feeding direction of the bead wire 26. When the cranks 29 and 30 are further rotated, the feeding bar 31 moves downward of the suspension bar 24 so that the suspension bar 24 again supports the bead wire 26, which is suspended in a resting state. In other words, during one rotation of the cranks 29 and 30, the feeding bar 31 moves from a lower position to an upper position than the suspension bar 24 to move the bead wire 26 in the feeding direction. The feeding bar 31 then returns to the lower position than the suspension bar 24. This is repeated, and the bead wire 26 is intermittently moved in the feeding direction from the distal side to the basal side of the suspension bar 24.

Operation of the storing device for bead wires configured as above will now be described.

During operation of the storing device, one of the feeding devices 22 is positioned at the first position, which is indicated on the right side as viewed in FIGS. 1 and 2. A plurality of annular bead wires 26 is manufactured through a shaping process of winding a wire material, a process of covering its surface with a rubber tape, and the like. In the feeding device 22 positioned at the first position, the supply device (not shown) intermittently supplies the head wires 26 in order onto the distal ends of the suspension bars 24. At this time, the motor 33 rotates the rotary shafts 27 and 23 to cause four-phase feeding movement in the feeding bars 31 inside the bead wires 26 suspended from the suspension bars 24 via the cranks 29 and 30 as shown in FIG. 4. This lifts all of the suspended bead wires 26 from the tops of the suspension bars 24 and intermittently moves the bead wires 26 at a predetermined pitch toward the basal sides of the suspension bars 24.

In this manner, the bead wires 26 are supplied to the suspension bars 24 and moved by the feeding bars 31 in the feeding device 22 positioned at the first position. This is repeated so that a predetermined number of bead wires 26 are arranged at predetermined intervals and suspended from the suspension bars 24. After that, the cylinder 20 moves the piston rod forward or backward to turn the turning frame 15 by 180 degrees. This moves the feeding device 22, in which the bead wires 26 are arranged, from the first position to the second position, which is indicated on the left side as viewed in FIGS. 1 and 2. At the same time, the other feeding device 22 is moved from the second position to the first position. In this state, supply and arrangement of bead wires 26 are performed similar to the above. Thus, the bead wires 26 are supplied and arranged on the suspension bars 24 in the feeding device 22 positioned at the first position. At this time, a worker is allowed to perform work such as an inspection on each bead wire 26 on the suspension bars 24 in the feeding device 22 positioned at the second position. The suspension bars 24 adjustably rotate about the respective horizontal axes so that the bead wires 26 move to turn around. This allows the bead wires 26 to be inspected for defective winding of the wire material or defective covering of the rubber tape.

Accordingly, the present embodiment achieves the following advantages.

(1) The feeding device according to the present embodiment is provided with the suspension bars 24 for suspending bead wires 26 as annular bodies. The feeding bars 31 are arranged near the respective suspension bars 24 to extend in parallel with the suspension bars 24. The feeding bars 31 are operable to intermittently move the bead wires 26 in the feeding direction inside the bead wires 26 suspended from the suspension bars 24. The feeding bars 31 are operationally coupled to the motor 33 as a driving member, which causes feeding movement in the feeding bars 31.

Thus, when the bead wires 26 are intermittently supplied and suspended from the distal ends of the suspension bars 24 in the feeding device, the motor 33 causes feeding movement in the feeding bars 31 inside the suspended bead wires 26. The feeding bars 31 lift the suspended bead wires 26 from the tops of the suspension bars 24 and intermittently move the bead wires 26 toward the basal sides of the suspension bars 24. Accordingly, in application in a manufacturing process of bead wires 26, the feeding device automatically arranges manufactured bead wires 26 on the suspension bars 24 and stores the suspended bead wires 26. This reduces operating time. In addition, the feeding device according to the present embodiment is not configured to move the bead wires 26 by pushing from the side, which is different from the conventional configuration described above. Thus, the bead wires 26 maintain distance from each other. This eliminates a need of a spacer, which is placed between each pair of bead wires 26 to maintain distance and reduces the complexity of the manufacturing process.

(2) In the storing device according to the present embodiment, the feeding devices 22, which each include the suspension bars 24, the feeding bars 31, and the motor 33, are supported by the lateral portions of the turning frame 15, which turns around a vertical axis. One of the feeding devices 22 is positioned at the first position, and bead wires 26 are supplied and arranged on the suspension bars 24 of the feeding device 22. After that, the turning frame 15 is turned by a predetermined angle. This moves the feeding device 22. in which the bead wires 26 are arranged, from the first position to the second position. The other feeding device 22 is positioned at the first position. In the feeding device 22 positioned at the first position, bead wires 26 are again supplied and arranged on the suspension bars 24. At the same time, in the feeding device 22 positioned at the second position, work such as an inspection is performed for the bead wires 26 on the suspension bars 24. This improves the operating efficiency.

(3) In the storing device according to the present embodiment, each suspension bar 24 of the feeding devices 22 is formed with a roller, which is rotational about its central axis. In the feeding device 22 positioned at the second position, the adjustable rotation of the suspension bars 24 moves the bead wires 26 to turn around. This makes work such as an inspection easy over the entire circumferences of the bead wires 26.

Modifications

The present embodiment may be modified in the following forms.

Three or more cranks may be provided for one feeding bar 31.

Only one supporting arm 231 may be provided.

One feeding bar 31 may be arranged in the middle of paired suspension bars 24 to extend in parallel with the suspension bars 24.

The feeding device 22 may foe applied to a storing device for annular bodies other than bead wires 26.

DESCRIPTION OF THE REFERENCE NUMERALS

15 . . . turning frame, 19 . . . pinion, 20 . . . cylinder, 21 . . . rack, 22 . . . feeding device, 23 . . . supporting frame, 231 . . . supporting arm, 24 . . . suspension bar, 26 . . . bead wire as an annular body, 27,28 . . . rotary shaft, 29, 30 . . . crank (driving mechanism), 31 . . . feeding bars, 33 . . . motor (driving mechanism), 34 . . . driving sprocket, 35, 36 . . . driven sprocket, 37 . . . chain.

The invention claimed is:

1. A feeding device comprising:
   two suspension bars for suspending an annular body, which are arranged on two parallel axes;
   two feeding bars, which extend in parallel with the suspension bars and are operable to intermittently move the annular body in a feeding direction inside the annular body suspended from the suspension bars, wherein the two feeding bars are arranged to sandwich the two suspension bars; and
   a driving mechanism that operates the feeding bars and includes two rotary shafts, a driving member for rotating the rotary shafts, and two cranks fixed to each rotary shaft, wherein each crank has a basal end and a distal end; wherein
   one of the two cranks fixed to each rotary shaft is fixed to the rotary shaft at the basal end and is coupled to one of the feeding bars to be rotational relative to the feeding bar at the distal end and the other one of the two cranks is fixed to the rotary shaft at the basal end and is coupled to the other one of the feeding bars to be rotational relative to the feeding bar at the distal end. and
   the feeding bar move from a lower position to an upper position that the suspension bars, during one rotation of the cranks, to lift the annular body from the suspension bars and to move the annular body in the feeding direction and then return to the lower position than the suspension bars.

2. The feeding device according to claim 1, wherein the driving member is a motor.

3. The feeding device according to claim 1, wherein the suspension bars are supported by a turning frame, which is capable of turning around a vertical axis.

4. The feeding device according to claim 3, wherein the suspension bars are capable of turning back and forth around the turning frame between two positions, which are located at angular difference of 180 degrees.

* * * * *